(12) United States Patent
Chen et al.

(10) Patent No.: US 10,742,323 B1
(45) Date of Patent: Aug. 11, 2020

(54) OPTICAL TRANSCEIVER

(71) Applicant: Prime World International Holdings Ltd., New Taipei (TW)

(72) Inventors: Yu Chen, New Taipei (TW);
Hsuan-Chen Shiu, New Taipei (TW);
Che-Shou Yeh, New Taipei (TW)

(73) Assignee: Prime World International Holdings Ltd., New Taipei (TW)

(*) Notice: Subject to any disclaimer, the term of this patent is extended or adjusted under 35 U.S.C. 154(b) by 0 days.

(21) Appl. No.: 16/584,302

(22) Filed: Sep. 26, 2019

(51) Int. Cl.
*H04B 10/40* (2013.01)
*G02B 6/38* (2006.01)
*G02B 6/42* (2006.01)
*H04B 10/25* (2013.01)
*H04B 10/43* (2013.01)
*H04B 10/50* (2013.01)
*H04B 10/60* (2013.01)

(52) U.S. Cl.
CPC ........... *H04B 10/40* (2013.01); *G02B 6/3893* (2013.01); *G02B 6/4261* (2013.01); *H04B 10/25* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 2004/0085722 | A1* | 5/2004 | Tanzer | G06F 1/182 361/679.31 |
| 2006/0258201 | A1* | 11/2006 | Schwiebert | G02B 6/4292 439/352 |
| 2007/0042631 | A1* | 2/2007 | Chen | G02B 6/3897 439/372 |
| 2009/0220227 | A1* | 9/2009 | Wong | G02B 6/4246 398/41 |
| 2012/0033979 | A1* | 2/2012 | Priyadarshi | G02B 6/4246 398/141 |

* cited by examiner

*Primary Examiner* — Darren E Wolf
(74) *Attorney, Agent, or Firm* — Grossman Tucker Perreault & Pfleger, PLLC

(57) ABSTRACT

An optical transceiver includes a housing, a fastening component, and a bail. The fastening component is movably disposed on the housing and configured to be detachably fastened with the cage. The bail is pivoted on the fastening component and includes a holding portion. The holding portion is configured to abut the housing to maintain a pivot angle between the bail and the fastening component.

16 Claims, 9 Drawing Sheets

OPTICAL TRANSCEIVER

BACKGROUND

1. Technical Field

The disclosure relates to an optical communication device, more particularly to a pluggable optical transceiver.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

A fastening mechanism is provided for securely fixing the optical transceiver to the cage. On the other hand, the optical transceiver must include a releasing mechanism so that the optical transceiver could be released from the cage smoothly when necessary.

SUMMARY

According to one aspect of the present disclosure, an optical transceiver configured to be inserted into a cage in a pluggable manner is disclosed. Such disclosed optical transceiver in one embodiment includes a housing, a fastening component, and a bail. The fastening component is movably disposed on the housing and configured to be detachably fastened with the cage. The bail is pivoted on the fastening component and includes a holding portion. The two holding portions are configured to respectively abut opposite lateral surfaces of the housing to maintain a pivot angle between the bail and the fastening component.

According to another aspect of the present disclosure, an optical transceiver configured to be inserted into a cage in a pluggable manner is disclosed. Such disclosed optical transceiver in one embodiment includes a housing, a fastening component, and a bail. The fastening component is movably disposed on the housing and configured to be detachably fastened with the cage. The bail is pivoted on the fastening component and includes two holding portions. Each of the two holding portions defines a contact surface. The two contact surfaces respectively abut opposite lateral surfaces of the housing by the rotation of the bail. A distance between the two contact surfaces of the two holding portions is equal to or smaller than the distance between the opposite lateral surfaces of the housing.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
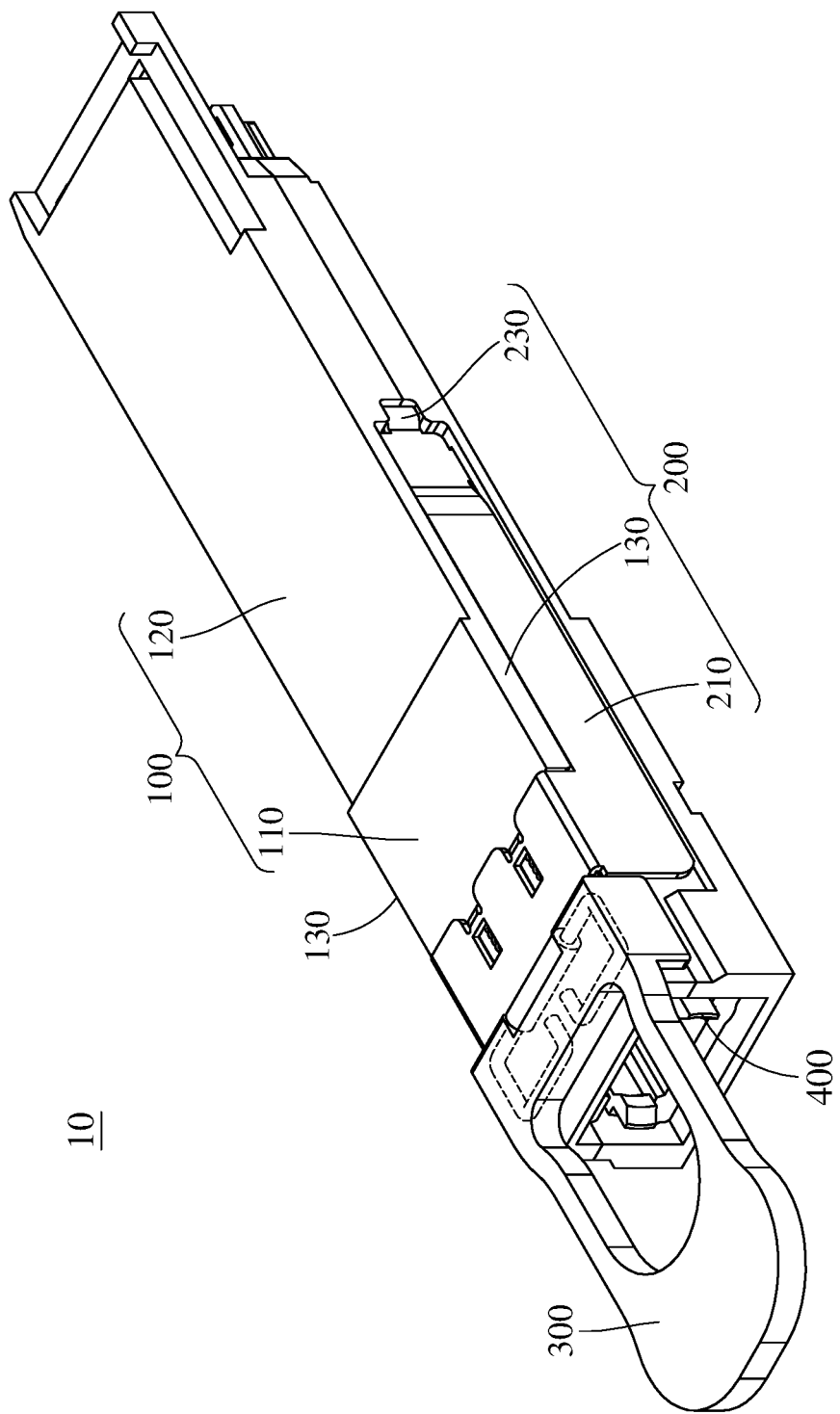
FIG. 1 is a perspective view of an optical transceiver and a cage according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
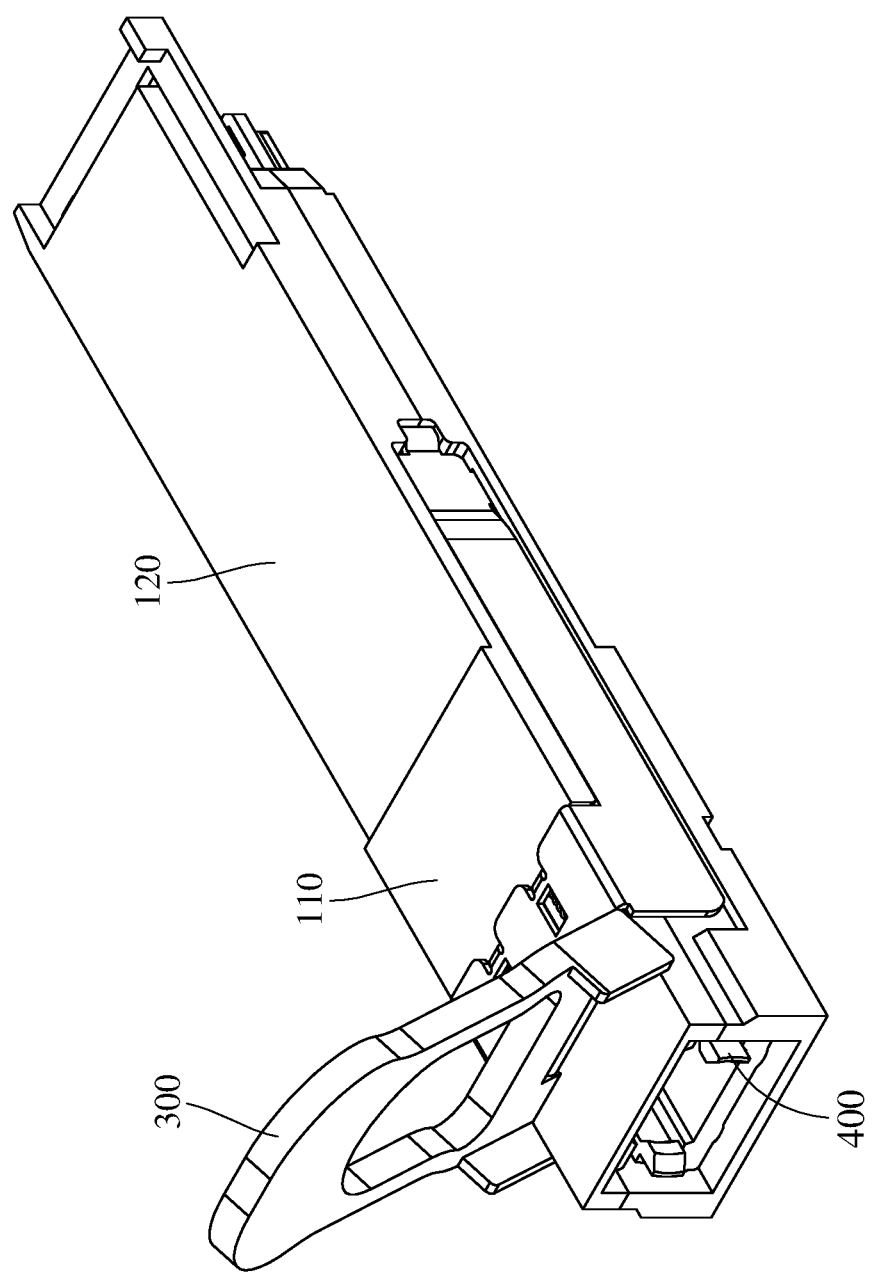
FIG. 2 is a perspective view of the optical transceiver in FIG. 1, with a bail at an upright position.

Please refer to FIG. 1 and FIG. 2. FIG. 1 is a perspective view of an optical transceiver and a cage according to a first embodiment of the present disclosure. FIG. 2 is a perspective view of the optical transceiver in FIG. 1, with a bail at an upright position. In this embodiment, an optical transceiver 10 is disclosed, and the optical transceiver 10 is inserted into a cage (not shown in the drawings) in a pluggable manner. The optical transceiver 10 includes a housing 100, a fastening component 200, a bail 300, and an optical connector 400.

The housing 100 includes a head portion 110 and an insertion portion 120 connected with each other. The insertion portion 120 is configured to be inserted into a plugging slot of the cage. The head portion 110 of the housing 100 includes two lateral surfaces 130. A sliding rail is formed on each of the two lateral surfaces 130 and extends from the head portion 110 to the insertion portion 120.

The fastening component 200 includes two extending arms 210 movably disposed on the sliding rails at the lateral surfaces 130, respectively. Each of the extending arms 210 includes a fastening portion 230 corresponding to a plugging slot of the cage. The fastening component 200 is movable relative to the housing 100, and the fastening portion 230 is configured to be fastened with the cage. Therefore, the optical transceiver 10 is readily and reliably inserted into the cage.

The bail 300 is pivoted on the fastening component 200 and extends outwardly from the housing 100. The bail 300 is in front of the head portion 110 or on the top of the head portion 110. The optical connector 400 might be disposed in the head portion 110 of the housing 100.

As shown in FIG. 2, the bail 300 could be moved around to be located above the head portion 110 of the housing 100, thereby creating some amount of space for one or more optical fiber jumpers or optical fibers (not shown in the drawings) to be plugged into the optical connector 400 more conveniently. When the bail 300 is at a horizontal position, the bail 300 protects the optical connector 400 from dust, and the insertion portion 120 of the housing 100 is removed from the cage when the horizontal bail 300 is drawn. The bail 300 could be moved from the horizontal position to an upright position so as render less cumbersome the installation or removal of the optical fiber jumpers. However, at the upright position, absent application of any external force may make the bail 300 simply go back to its initial position, such that extra maneuver of the bail 300 is required for any optical fiber jumper to be plugged into the optical connector 400.

Figure 3:
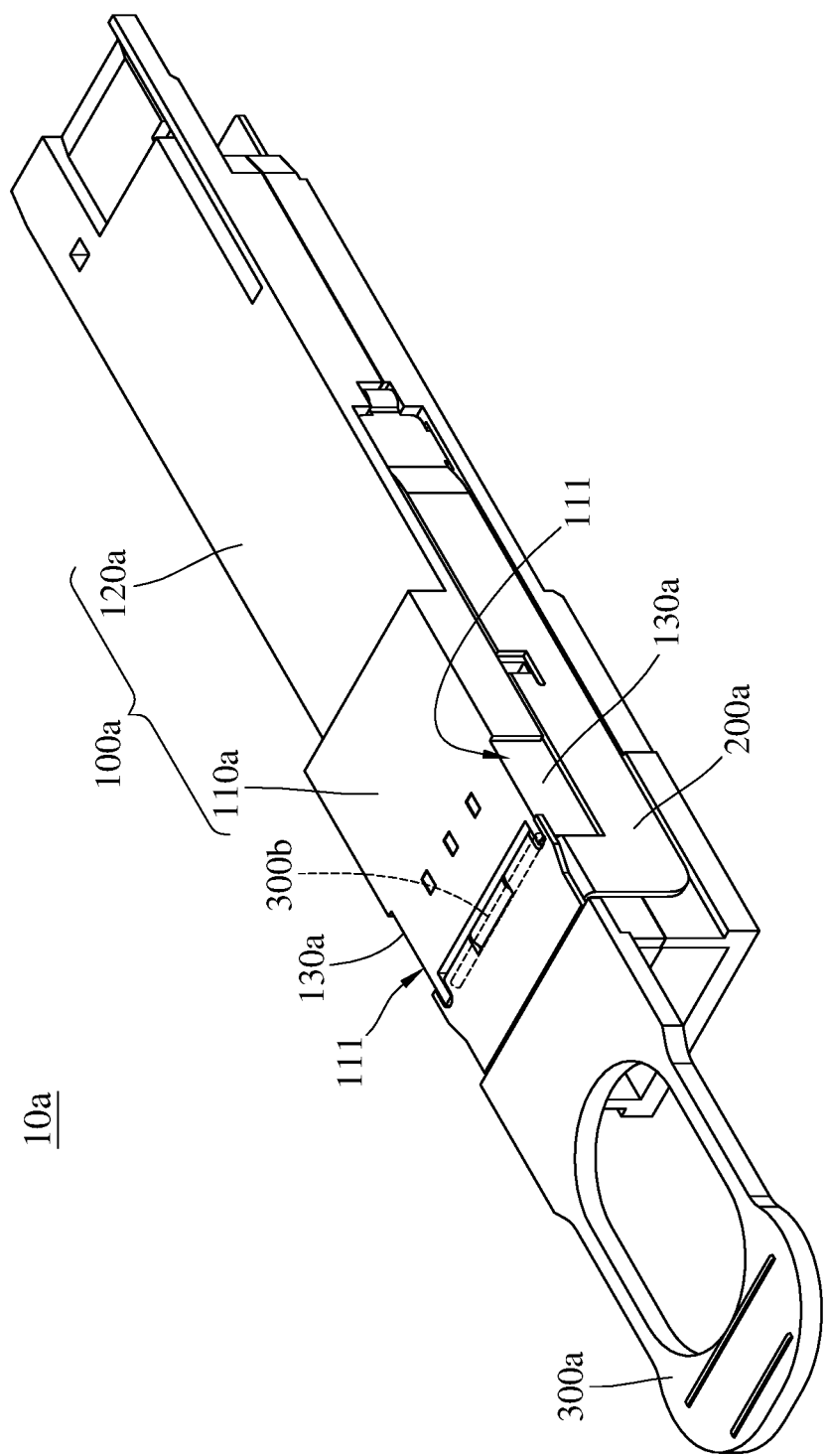
FIG. 3 is a perspective view of an optical transceiver according to a second embodiment of the present disclosure.
Figure 4:
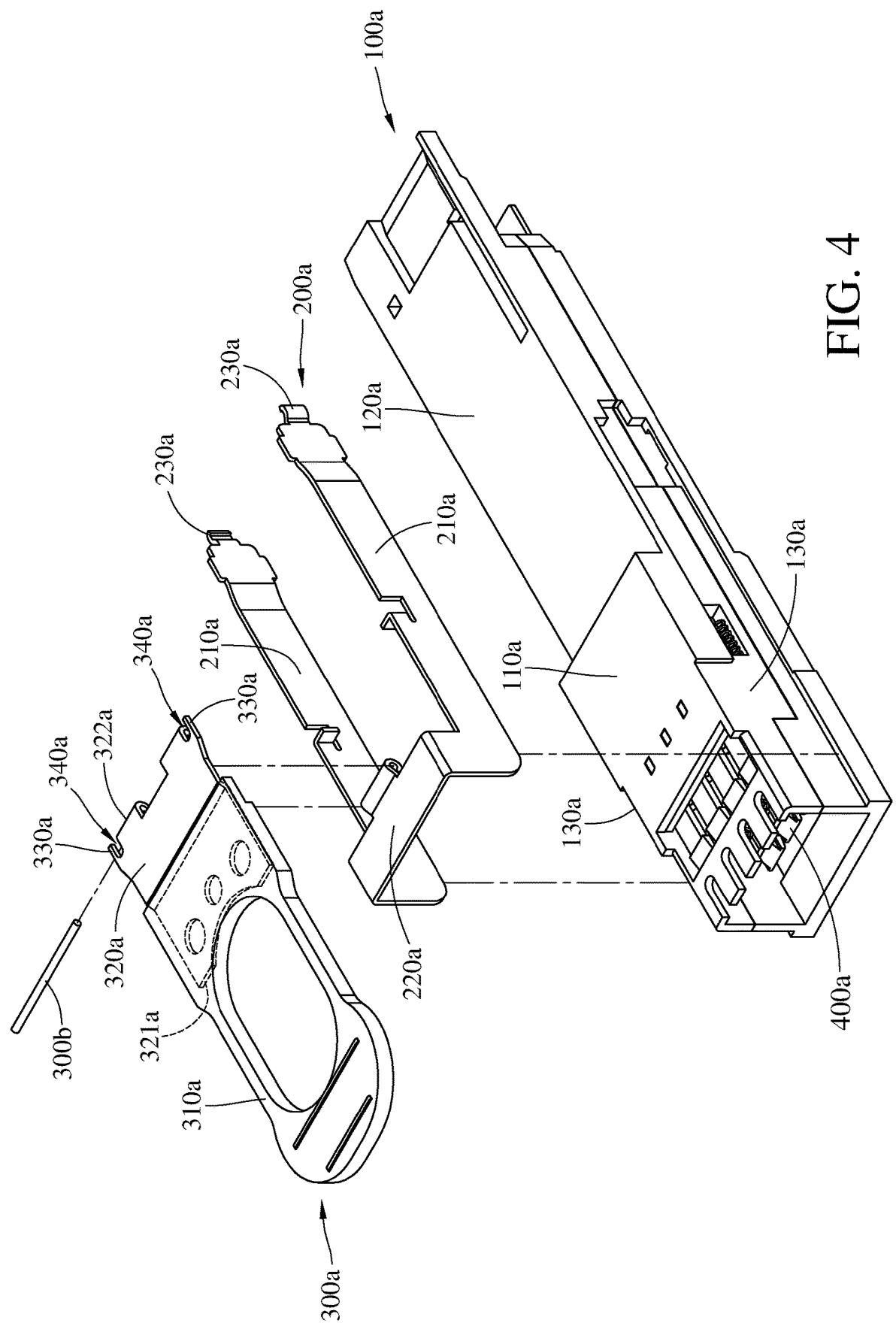
FIG. 4 is an exploded view of the optical transceiver in FIG. 3.

A configuration of the optical transceiver 10 could be improved. Please refer to FIG. 3 and FIG. 4. FIG. 3 is a perspective view of an optical transceiver according to a second embodiment of the present disclosure. FIG. 4 is an exploded view of the optical transceiver in FIG. 3. In this embodiment, an optical transceiver 10a is a QSFP-DD (Quad Small Form-factor Pluggable Double Density) optical transceiver, and the optical transceiver 10a is configured to be inserted into a cage (not shown in the drawings) in a pluggable manner. The optical transceiver 10a includes a housing 100a, a fastening component 200a, a bail 300a, a pivot shaft 300b, and an optical connector 400a.

The housing 100a includes a head portion 110a and an insertion portion 120a connected with each other. The head portion 110a of the housing 100a includes two lateral surfaces 130a opposite to each other. A sliding rail is formed on each of the two lateral surfaces 130a and extends from the head portion 110a to the insertion portion 120a. The optical connector 400a is disposed in the head portion 110a of the housing 100a.

The fastening component 200a includes two extending arms 210a and a linkage arm 220a. The linkage arm 220a is connected with the two extending arms 210a. The linkage arm 220a is disposed on the top surface of the housing 100a. The extending arms 210a are movably disposed on the sliding rails at the lateral surfaces 130a, respectively. Each of the extending arms 210a includes a fastening portion 230a. The fastening component 200a is movable relative to the housing 100a, such that the fastening portion 230a is able to be fastened with a cage.

Figure 5:
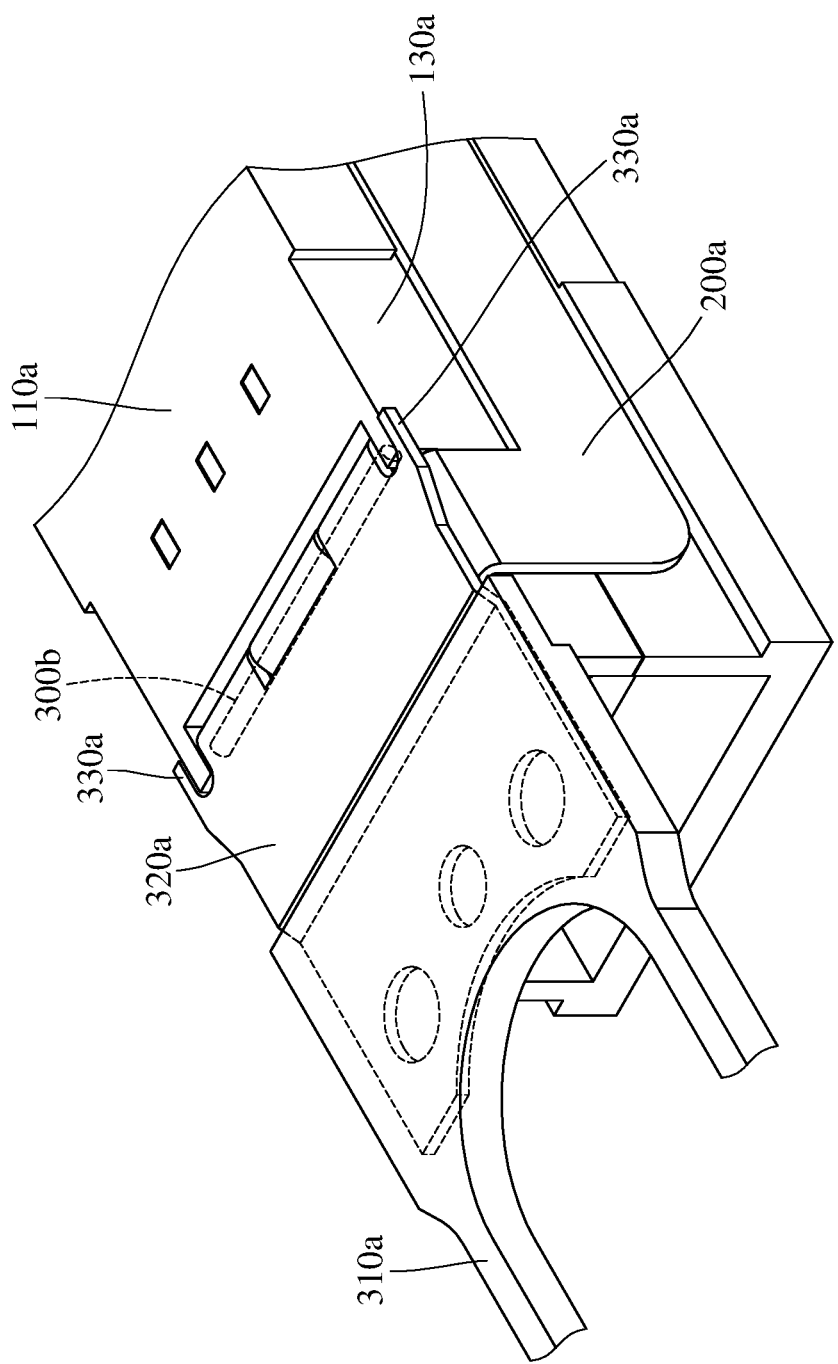
FIG. 5 is a partially enlarged view of the optical transceiver in FIG. 3.

Please further refer to FIG. 5, which is a partially enlarged view of the optical transceiver in FIG. 3. The bail 300a includes a handle 310a, a connecting portion 320a and two holding portions 330a. The handle 310a is connected with a first side 321a of the connecting portion 320a. The two holding portions 330a are connected with a second side 322a of the connecting portion 320a opposite to the first side 321a. The two holding portions 330a extend from the second side 322a in a direction away from the handle 310a. It is worth noting that the number of the holding portions 330a is not limited by the embodiments discussed in the present disclosure.

The pivot shaft 300b is disposed on the linkage arm 220a of the fastening component 200a so as to define a pivot joint. The connecting portion 320a of the bail 300a is pivoted on the linkage arm 220a of the fastening component 200a via the pivot shaft 300b. It is worth noting that the configuration of the optical transceiver 10a is not limited by the embodiments discussed in the present disclosure. In some embodiments, the optical transceiver does not include pivot shaft; instead, the bail includes two pins connected with the connecting portion, and the pins are pivoted on the linkage arm of the fastening component to define the pivot joint.

Figure 6:
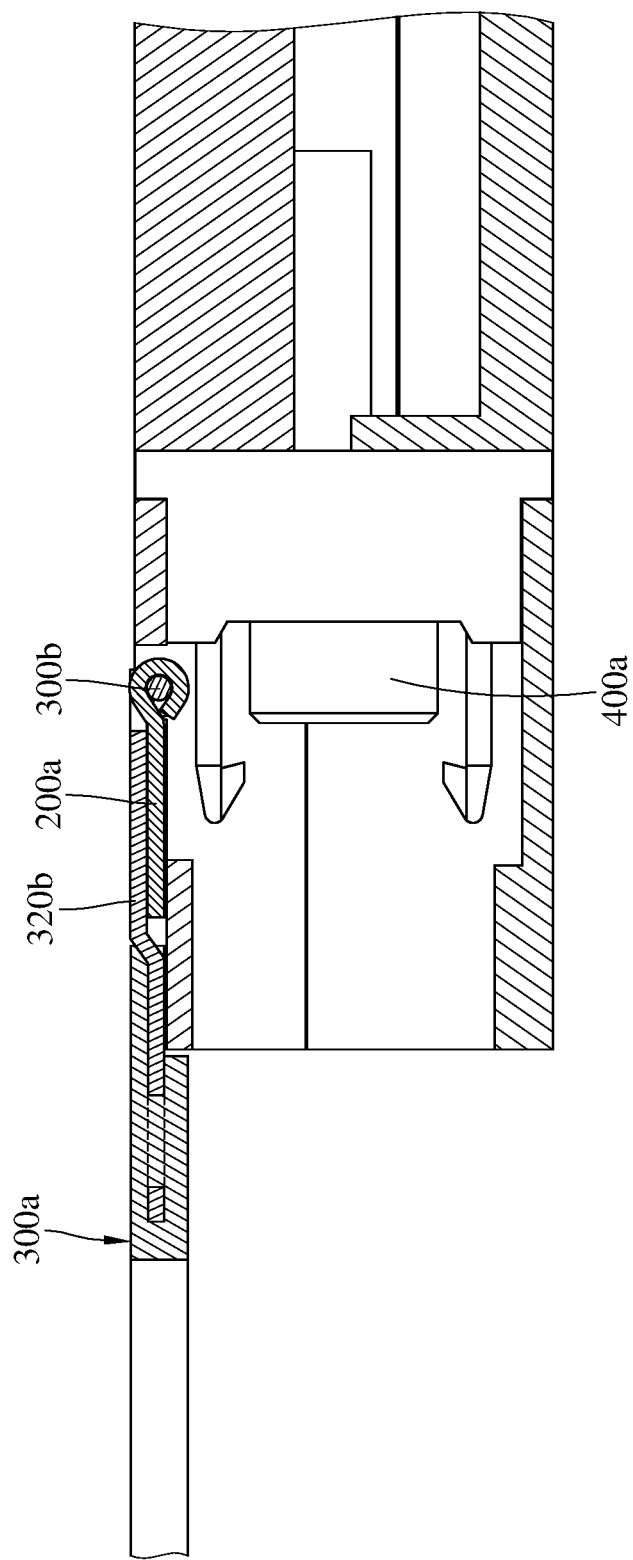
FIG. 6 is a cross-sectional view of the optical transceiver in FIG. 3.
Figure 7:
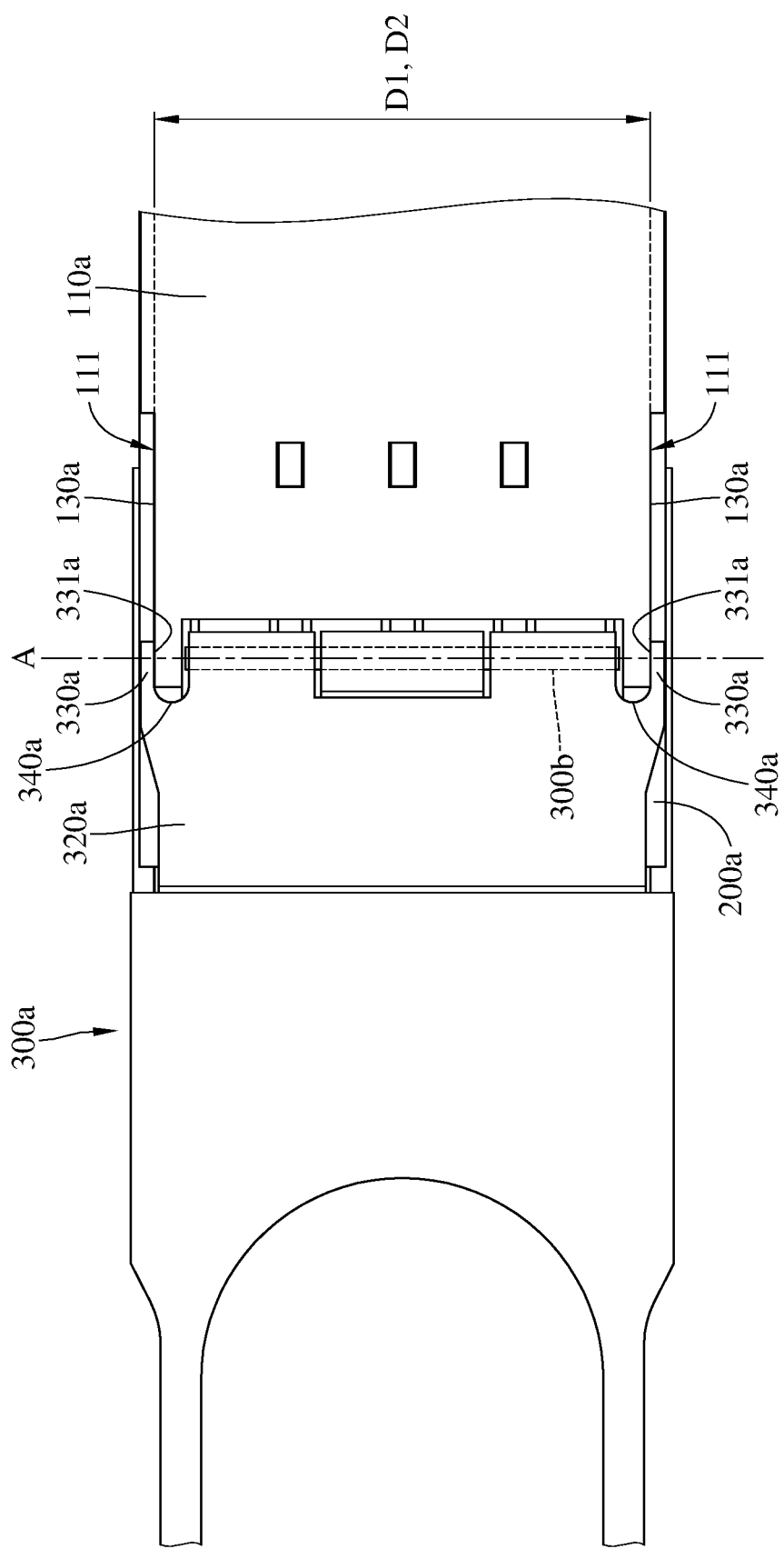
FIG. 7 is a top view of the optical transceiver in FIG. 3.

Please further refer to FIG. 6 and FIG. 7. FIG. 6 is a cross-sectional view of the optical transceiver in FIG. 3. FIG. 7 is a top view of the optical transceiver in FIG. 3.

According to one embodiment of the present disclosure, each of the holding portions 330a includes a contact surface 331a facing toward the lateral surface 130a of the housing 100a. A normal direction of the contact surface 331a is parallel to the axis A of the pivot shaft 300b (pivot joint). The two contact surfaces 331a respectively abut the opposite lateral surfaces 130a of the housing 100a by the rotation of the bail 300a. The distance D1 between the two contact surfaces 331a is equal to the distance D2 between the lateral surfaces 130a. In some embodiments, the distance D1 between the two contact surfaces 331a is smaller than the distance D2 between the lateral surfaces 130a.

According to one embodiment of the present disclosure, the connecting portion 320a of the bail 300a is pivoted on the fastening component 200a at the pivot joint (pivot shaft 300b), and an axis A of the pivot shaft 300b extends through the two holding portions 330a of the bail 300a.

According to one embodiment of the present disclosure, two accommodation grooves 111 are respectively formed on opposite sides of the head portion 110a of the housing 100a. The two holding portions 330a of the bail 300a respectively extend into the two accommodation grooves 111. Therefore, the width of the optical transceiver 10a could be further managed so as to be satisfying the different specification requirements of transceiver standards.

According to one embodiment of the present disclosure, a recess 340a is formed between each holding portion 330a and the pivot shaft 300b (pivot joint), and a part of the head portion 110a of the housing 100a is accommodated in the recesses 340a. Therefore, the area of the housing 100a touched by the contact surface 331a might increase, thereby obtaining a stronger friction fit or interference fit.

Figure 8:
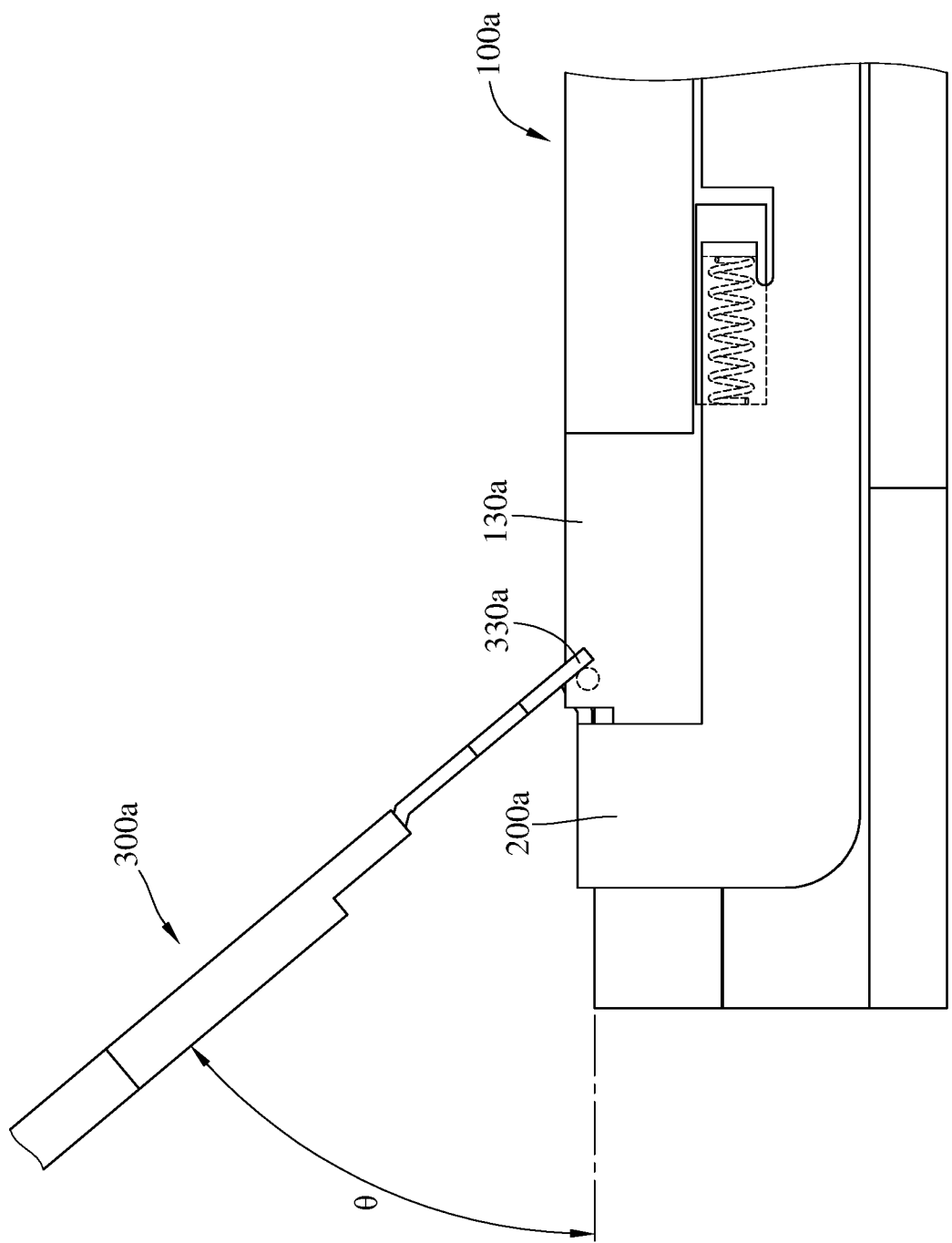
FIG. 8 is a side view of the optical transceiver with a bail at an upright position.
Figure 9:
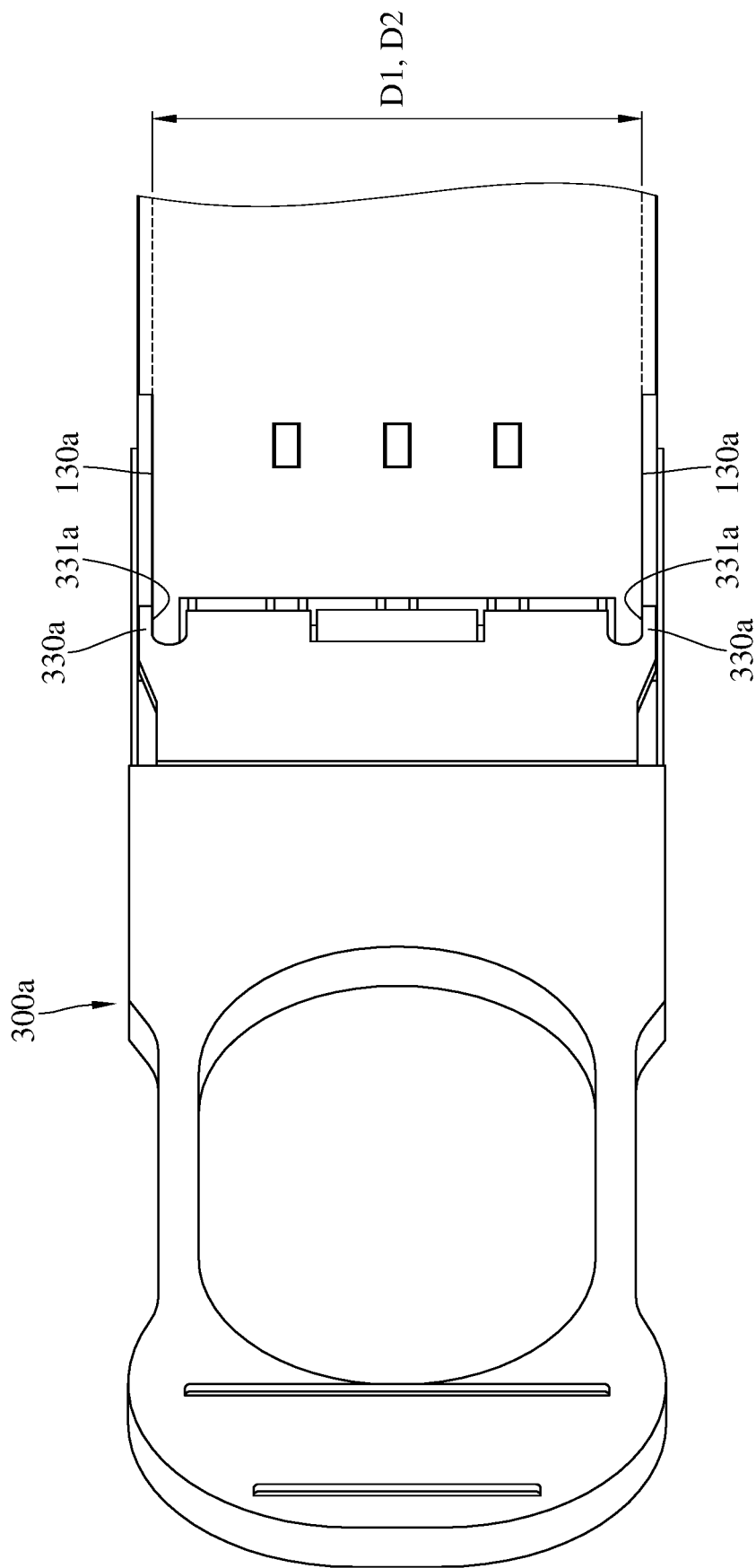
FIG. 9 is a top view of the optical transceiver in FIG. 8.

Please further refer to FIG. 8 and FIG. 9. FIG. 8 is a side view of the optical transceiver with a bail at an upright position. FIG. 9 is a top view of the optical transceiver in FIG. 8.

Referring to FIG. 6 through FIG. 8, when the bail 300a is at a horizontal position, the bail 300a protects the optical connector 400a from dust. The bail 300a could be moved around from the horizontal position to the upright position. When the bail 300a is at the upright position, the holding portions 330a of the bail 300a respectively abut the lateral surfaces 130a of the housing 100a so as to maintain a pivot angle θ between the bail 300a and the fastening component 200a. In detail, the contact surface 331a of the holding portion 330a abuts the lateral surface 130a of the housing 100a, and a part of the housing 100a is located between the two contact surfaces 331a. Thus, the pivot angle θ between the bail 300a and the fastening component 200a is maintained by the interaction between the holding portions 330a and the housing 100a. In an embodiment that the distance D1 between the two contact surfaces 331a is equal to the distance D2 between the lateral surfaces 130a, the pivot angle θ is maintained by the static frictional force between the holding portions 330a and the housing 100a. In another embodiment that the distance D1 is smaller than the distance D2, the pivot angle θ is maintained by the interference fit between the holding portions 330a and the housing 100a. Since the holding portions 330a hold the bail 300a at the upright position to maintain the pivot angle θ, the installation or removal of the optical fibers without requiring the bail 300a being held by hands or any application of external force could be facilitated.

According to the present disclosure, the bail includes holding portions configured to contact the housing, such that the bail is held at the upright position with a pivot angle between the bail and the fastening component. Therefore, it is favorable for convenient installation or removal of the optical fibers without application of external force to hold the bail.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical transceiver, configured to be inserted into a cage in a pluggable manner, comprising:
   a housing;
   a fastening component movably disposed on the housing and configured to be detachably fastened with the cage; and
   a bail pivoted on the fastening component and comprising a holding portion;
   wherein the holding portion is configured to abut the housing to maintain a pivot angle between the bail and the fastening component.

2. The optical transceiver according to claim 1, comprising two holding portions, wherein when the two holding portions abut the housing, a contact surface of each of the two holding portions abuts the housing, and a part of the housing is located between the two contact surfaces of the two holding portions.

3. The optical transceiver according to claim 2, wherein the bail further comprises a handle and a connecting portion, the connecting portion is pivoted on the fastening component, the handle is connected with a first side of the connecting portion, the two holding portions are connected with a second side of the connecting portion opposite to the first side, and the two holding portions extend from the second side in a direction away from the handle.

4. The optical transceiver according to claim 3, wherein the connecting portion is pivoted on the fastening component at a pivot joint, and a recess is formed between each of the two holding portions and the pivot joint, and a part of the housing is accommodated in the recess.

5. The optical transceiver according to claim 3, wherein the connecting portion is pivoted on the fastening component at a pivot joint, and an axis of the pivot joint extends through the two holding portions.

6. The optical transceiver according to claim 1, wherein the pivot angle between the bail and the fastening component is maintained by interference fit between the holding portion and the housing.

7. The optical transceiver according to claim 1, wherein the pivot angle between the bail and the fastening component is maintained by static frictional force between the holding portion and the housing.

8. The optical transceiver according to claim 1, wherein the optical transceiver is a QSFP-DD (Quad Small Form-factor Pluggable Double Density) optical transceiver.

9. An optical transceiver, configured to be inserted into a cage in a pluggable manner, comprising:
   a housing;
   a fastening component movably disposed on the housing and configured to be detachably fastened with the cage; and
   a bail pivoted on the fastening component and comprising two holding portions, each of the two holding portions defining a contact surface, the two contact surfaces respectively abutting opposite lateral surfaces of the housing by rotation of the bail, a distance between the two contact surfaces of the two holding portions being equal to or smaller than a distance between the opposite lateral surfaces of the housing.

10. The optical transceiver according to claim 9, wherein the two contact surfaces of the two holding portions respectively abut the opposite lateral surfaces of the housing to maintain a pivot angle between the bail and the fastening component.

11. The optical transceiver according to claim 10, wherein the pivot angle between the bail and the fastening component is maintained by interference fit between the two holding portions and the housing.

12. The optical transceiver according to claim 10, wherein the pivot angle between the bail and the fastening component is maintained by static frictional force between the two holding portions and the housing.

13. The optical transceiver according to claim 9, wherein the bail further comprises a handle and a connecting portion, the connecting portion is pivoted on the fastening component, the handle is connected with a first side of the connecting portion, the two holding portions are connected with a second side of the connecting portion opposite to the first side, and the two holding portions extend from the second side in a direction away from the handle.

14. The optical transceiver according to claim 13, wherein the connecting portion is pivoted on the fastening component at a pivot joint, and a recess is formed between each of the two holding portions and the pivot joint, and a part of the housing is accommodated in the recess.

15. The optical transceiver according to claim 13, wherein the connecting portion is pivoted on the fastening component at a pivot joint, and a normal direction of the contact surface of the holding portion is parallel to an axis of the pivot joint.

16. The optical transceiver according to claim 9, wherein the optical transceiver is a QSFP-DD (Quad Small Form-factor Pluggable Double Density) optical transceiver.

* * * * *